Nov. 15, 1960  V. DIEHL ET AL  2,959,818
MOLDING APPARATUS

Filed May 18, 1956                                      2 Sheets-Sheet 1

Victor Diehl &
Alan V. Diehl,
INVENTORS.

BY R. E. Jeangue

ATTORNEY.

Nov. 15, 1960 V. DIEHL ET AL 2,959,818
MOLDING APPARATUS
Filed May 18, 1956 2 Sheets-Sheet 2

Victor Diehl &
Alan V. Diehl.
INVENTORS.

BY R. E. Geauque
ATTORNEY.

United States Patent Office 2,959,818
Patented Nov. 15, 1960

2,959,818

MOLDING APPARATUS

Victor Diehl and Alan V. Diehl, both of 6843 Willis Ave., Van Nuys, Calif.

Filed May 18, 1956, Ser. No. 585,830

10 Claims. (Cl. 18—42)

This invention relates to a molding apparatus and more particularly to an apparatus for molding cored articles, such as tank balls, which apparatus incorporates means for quickly stripping and removing the articles from the mold.

The apparatus of the present invention can utilize any suitable molding material, such as rubber, to mold articles of various shapes which are difficult to remove from the mold and the apparatus is particularly adapted for the molding of rubber tank balls generally utilized in toilet flushing systems. Molds presently in use for the production of such tank balls require that the articles be manually stripped from the stationary cavity plate by striking the core with a suitable tool, such as a brass hammer. Thereafter, each tank ball is individually removed from the core with a hand operated air hose. Each core of the mold has a passage connected with an air valve so that compressed air can be introduced between the article and the core in order to remove the article. Considerable time and effort is required to manually connect the air hose individually with each of the air passages in the mold and thus, it is apparent that such molds have limited output.

The present invention utilizes a stationary and a movable cavity plate or section to form a plurality of article cavities, each of which contains a core of suitable shape. Each core is slidably mounted on the stationary section and the interior of each core is connected with a compressed air source by a manifold plate positioned above the stationary section. A release valve is located on the lower surface of each core so that compressed air can be introduced between the core and the article to remove the article. After the movable section is separated from the stationary section, the compressed air, simultaneously introduced to all of the cores, causes the cores to first move away from the stationary section, in order to strip the article from the stationary section. Thereafter, the compressed air simultaneously removes all of the articles from the cores and a shut-off valve is provided to interrupt the flow of compressed air after removal of the articles. Thus, the molding apparatus of the present invention can be rapidly operated for large scale production since the stripping and removal operations are automatically accomplished with compressed air.

It is therefore an object of the present invention to provide a molding apparatus in which the articles are stripped from the mold and thereafter removed from the cores by fluid pressure.

Another object of the invention is to provide a working fluid manifold to simultaneously supply each core of the molding apparatus with fluid pressure to simultaneously remove the molded articles.

Another object of the invention is to provide a molding apparatus which can be rapidly operated for large scale production with a minimum of manual operation.

Another object of the invention is the provision of a mold core which incorporates a novel release valve for controlling the stripping of the molded article from one of the mold sections and the removal of the article from the core with a minimum amount of working medium.

These and other objects of the invention, not specifically set forth above, will become readily apparent from the accompanying description and drawing in which.

Figure 1:
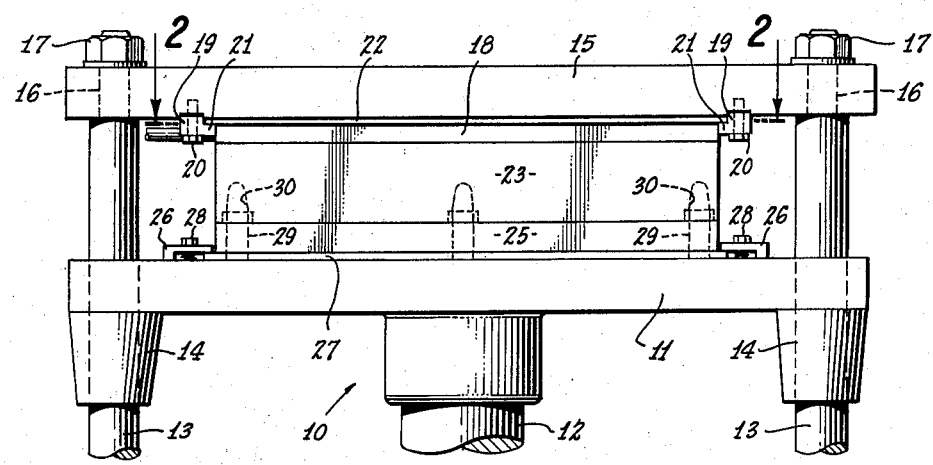
Figure 1 is a side elevational view of the molding apparatus of the present invention incorporated in a hydraulic press.

Referring to Figure 1, one embodiment of the invention utilizes a hydraulic press 10 having a movable platform 11 secured to piston rod 12 for movement by the piston rod. The platform is guided by a plurality of stationary rods 13, which are slidably received by fittings 14 carried by the platform and preferably, a rod 13 is positioned at each corner of the press. A stationary plate 15 has openings for receiving the reduced ends 16 of rods 13 so that the plate can be rigidly attached to the rods by nuts 17. The plate 15 rigidly supports a manifold section 18 by means of lugs 19 which are secured to plate 15 by bolts 20 and have legs 21 for gripping ledge 22 of section 18. In turn, upper mold section 23 is rigidly secured to manifold section 18 by a plurality of bolts 24 so that the section 23 is held stationary, independently of the movement of piston rod 12. The platform 11 is attached to lower mold section 25 by a plurality of lugs 26 which are held against ledge 27 of section 25 by bolts 28. Prior to the tightening of bolts 28, the lower section 25 is raised by platform 11 to insert dowel pins 29, carried by section 25, into sockets 30 in section 23 in order to accurately locate section 25 and insure that the cavities in each section will meet. After the molding operation, the lugs 26 permit quick removal and replacement of the lower section 25 for purposes later to be explained.

Figure 2:
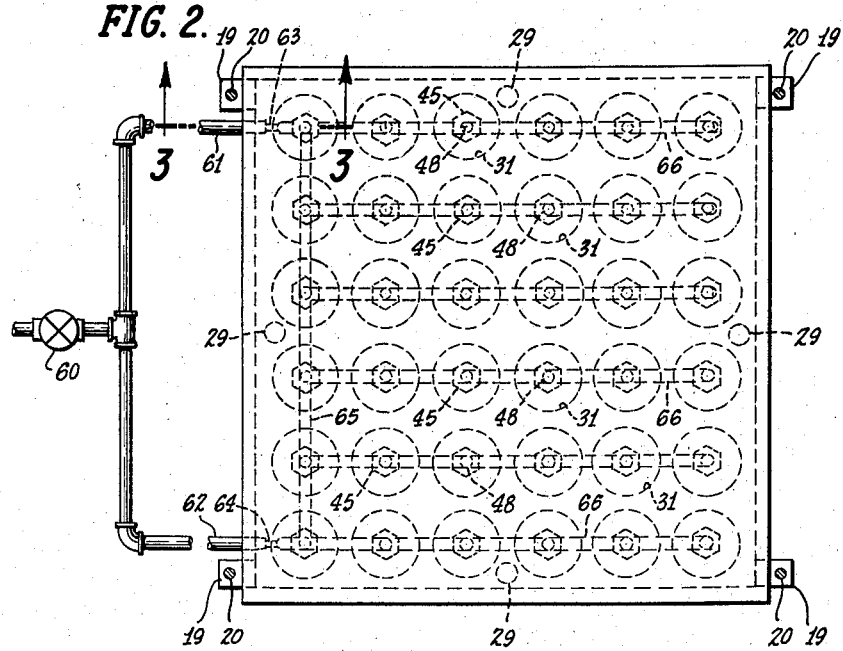
Figure 2 is a horizontal section along line 2—2 of Figure 1 showing the location of the cavities and the air manifold connected to the cavities.
Figure 3:
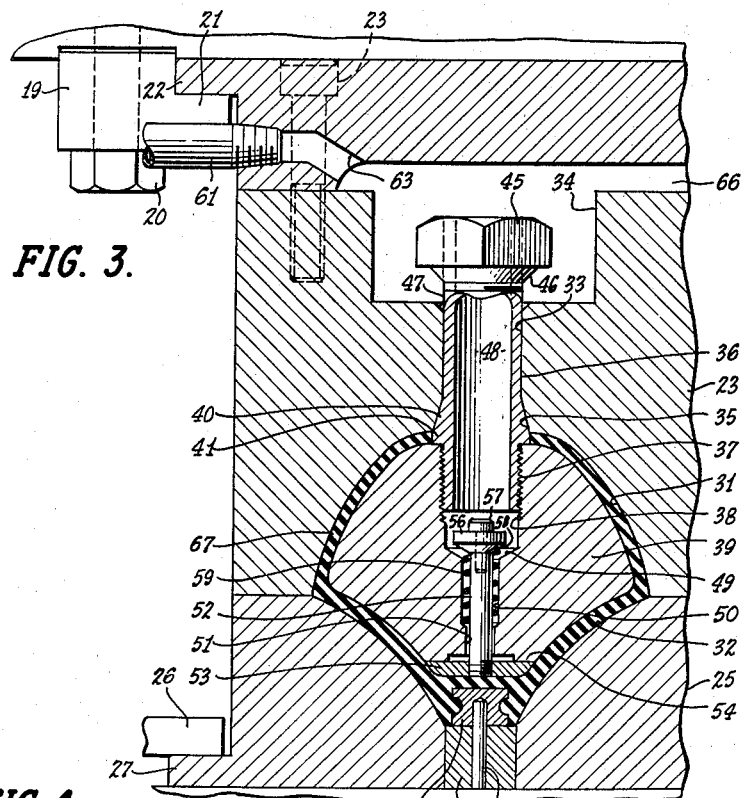
Figure 3 is a vertical section along line 3—3 of Figure 2 illustrating the closed position of the molding apparatus and of the release valve of the core.

The upper mold section 23 contains a plurality of substantially concave cavity portions 31 on its lower surface while the lower mold section 25 contains a like number of cavity portions 32 of substantially conical shape on its upper surface. When the molding apparatus is in closed position, as illustrated in Figure 3, the edge of the cavity portions 31 and 32 meet to form complete cavities of the desired shape for a tank ball. The complete cavities are distributed in the mold sections in the manner illustrated in Figure 2 but any suitable number and pattern of cavities can be utilized. Cylindrical openings 33 in section 23 connect the top of each cavity with a circular cavity 34 in the upper surface of section 23 and each opening 33 has a flared surface 35 at the end which connects with the cavity.

Each opening 33 receives a core stem 36 having an end 37 threaded into opening 38 in mold core 39. The core stem has a beveled portion 40 terminating in a cylindrical section 41, which engages the surface of core 39 when the stem is threaded into the core. With the mold sections in closed position, the surface of beveled portion 40 tightly engages the flared surface 35 in order to properly locate the core within the mold cavity to form a tank ball of desired shape and cross section. In this position of the core, the section 41 provides a cylindrical surface for forming a circular opening in the top of the molded tank ball. The lower surface of cavity portions 32 of mold section 25 is formed by a steel bushing 42 containing a tube 43 which projects upwardly into the mold cavity and holds the brass insert 44 in place during the molding operation.

A valve nut 45 is threaded to the upper end of each core stem and has a valve surface 46 shaped to co-operate with valve seat 47 formed at the upper end of opening 33. Both the stem 36 and nut 45 have a central air passage 48 leading to the opening 38 in the mold core. The opening 38 contains a valve seat 49 which connects with a smaller opening 50 in the core and opening 50 connects with a still smaller opening 51 which slidably receives valve stem 52. A release valve 53 is threaded to the lower end of stem 52 and the surface of this valve co-operates with surface 54 surrounding a cavity 55 in the lower portion of the core. The outer surface of valve 53 is shaped to conform with the surface of core 39 and in closed position of the mold, the outer surface is spaced from the inserts 44. Also, sufficient clearance exists between stem 52 and opening 51 to provide an air passage from opening 50 to cavity 55 for purposes later to be explained.

A shut-off valve 56 is secured to the upper end of stem 52 by a bolt 57 which is threaded into the end of the stem and valve 56 has a lower valve surface 58 which co-operates with the valve seat 49 formed in the core. The opening 50 contains a light spring 59 which continually acts against valve 56 to normally hold valve 56 in open position and valve 53 in closed position as illustrated in Figure 3. The cavity 34 is of sufficient depth to permit movement of the core stem and valve nut 45 to the extreme upper position as determined by the engagement of portion 40 with surface 35. Also, each of the cavities 34 is connected with a source of compressed air (not shown) through valve 60 and through inlet passages 61 and 62 which connect to passages 63 and 64, respectively, in the manifold section 18. The passages 62 and 63 lead to a manifold passage 65 which connects all of the cavities 34 in one row of the upper mold section 23. A passage 66 connects with manifold passage 65 at each of these cavities and extends perpendicular to passage 65 across the mold to connect with all of the cavities 34 in line with each cavity connected with passage 65. Thus, each of the cavities 34 in the upper mold section can be supplied with compressed air through passage 65 and the plurality of passages 66 by opening the valve 60.

The operation of the molding apparatus will now be described in connection with Figures 3, 4 and 5 which illustrate the construction of one of the mold cavities and cores and it is understood that all of the cavities and cores are constructed in a like manner for similar operation. While the cavities are preferably arranged in a plurality of parallel rows, as indicated in Figure 2, any suitable arrangement of cavities can be accomplished and the number of cavities can be varied. Prior to positioning mold section 25 on platform 11, the cavity portions 32 of this section are loaded with the inserts 44 and with molding material. In loading the section 25, the brass inserts 44 are slipped over the ends of tubes 43 and rest upon the bushings 42. Although the openings in the inserts are threaded, the tubes 43 are of small enough diameter so that the inserts can be slipped over the end of the tubes without interference from the threads. Thereafter, a slug of crude rubber or other suitable molding material of the proper weight to produce the molded article, is placed in cavity portions 32 above the inserts 44. After loading of the lower mold section 25, this section is placed on platform 11 and is positioned so that dowel pins 29 are in alignment with the sockets 30 in the upper mold section 23. This can be accomplished by partially closing the press or in any other suitable way. After the lower mold section 25 is properly positioned, the bolts 28 are then tightened to firmly hold the section 25 in place with lugs 26.

In order to accomplish the molding operation, the platform 11 and mold section 25 are moved upwardly towards mold section 23 by the piston rod 12. The pressure applied to the mold sections forces the molding material into each mold cavity and around the core 39 to produce a homogeneous tank ball 67, shaped to the contour of the cavity. During this forming operation, the core 39 will be held in its upward position, as illustrated in Figure 3, because of the force applied by the molding material to the lower surface of the core during the closing of the press. When raw or crude rubber is utilized as a molding material, the molding apparatus is held closed under a suitable temperature for a pre-determined time to insure proper curing of the material and it is understood that suitable heating elements can be incorporated in the molding apparatus for this purpose.

Upon completion of the molding operation, the lower mold section 25 is moved away from upper mold section 23 by lowering platform 11 and thereafter, the section 25 will be completely removed from the press after loosening lugs 26. A container 68 of the approximate size of the lower mold section can then be inserted on platform 11, underneath the upper section, in order to receive the tank balls discharged from the cores. The downward movement of the mold section 25 will strip the molded articles from cavity portions 32 and will remove rod 43 from the inserts 44, leaving the molded articles still positioned within the cavity portions 31. The compressed air valve 60 can now be opened by the operator to direct compressed air to the cavities 34 and through air passages 48 to openings 38 in the mold cores. This initial air pressure will immediately act upon the interior surfaces of each core to cause the core and tank ball to drop downwardly into the position illustrated in Figure 4, thus stripping the tank ball from the cavity portion 31. This downward movement causes the valve surface 46 of valve nut 45 to engage the valve seat 47 and prevent loss of compressed air around core stem 36.

The continued application of compressed air to opening 38, together with the weight of the core 39, will serve to hold the core in this down position. Also, the compressed air will pass from opening 38 to cavity 55 through the clearance space between stem 52 and opening 51 and the compressed air in cavity 55 will cause the release valve 53 to move slightly downward into the position illustrated in Figure 4 to permit compressed air to escape into a space 69 between the tank ball and the core. Sufficient air pressure will quickly develop between the core and the tank ball to remove the ball from around the core. Since the tank ball is fabricated of a suitable elastic material, the opening in the top of the tank ball will stretch and pass over the core. The removed articles are collected in the container 68 which can be quickly removed in platform 11.

Figure 5:
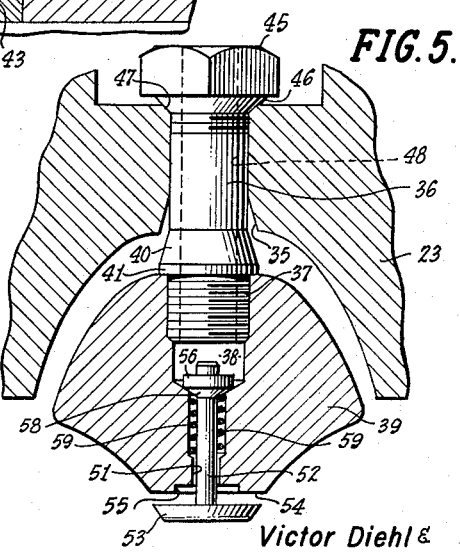
Figure 5 is a fragmentary sectional view, similar to Figure 3, showing the position of the core and release valve after removal of the molded article.

After the articles have been removed from the core, the continued application of air pressure against the upper surface of valve 53 will cause downward movement of valve stem 52 against the weak spring 59 and will cause the valve surface 58 to engage the valve seat 49 in the manner illustrated in Figure 5. The seating of the valve 56 will interrupt the flow of compressed air to cavity 55 and thus prevent the unnecessary escape of compressed air to atmosphere, even though valve 60 remains open. After the valve 56 is seated, it will be held in this condition by the continued application of air pressure to the upper surface of the valve. Thus, the operator can close the valve 60 at any time after the removal of the molded articles with the assurance that there will be no unnecessary use of the compressed air supply. After valve 60 is closed in preparation for the next molding operation, the core 39 will remain in the down position illustrated in Figure 5 and the shut-off valve 56 will be moved upwardly by the spring 59 so that the core and upper mold section are in condition for the next molding operation.

By the use of two lower mold sections 25, it is apparent that one mold section can be loaded with inserts 44 and the slug of molding material, while the other section is in use in the molding apparatus to form the molded articles. Upon the opening of the molding apparatus, the lower mold section in the apparatus can be quickly removed and the application of air pressure through valve 60 will quickly discharge the molded articles into container 68 so that the molded articles can be removed from the press. Thereafter, the second loaded section 25 can be inserted into the press and the molding operation commenced while the removed section can be again loaded. It is thus seen that the molding apparatus can be maintained in substantially continuous operation since the unloading of the tank balls from the mold sections is completely automatic. Thus, the molding apparatus of the present invention can be rapidly operated for large scale production with a minimum of manual operation.

Figure 4:
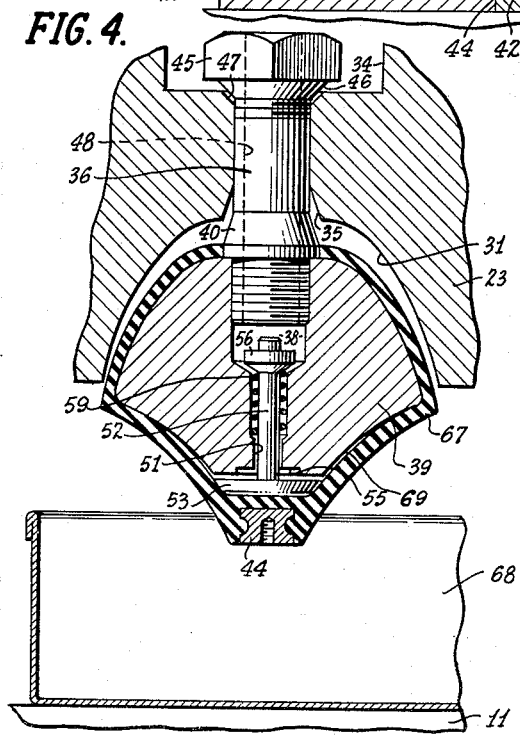
Figure 4 is a fragmentary sectional view, similar to Figure 3, showing the position of the core and release valve after completion of the molding operation and removal of the lower mold section.

The amount of clearance between the core and the upper mold section is adjusted by the position of valve nut 45 on core stem 36, as illustrated in Figure 4, to provide space for the escape of the molded article. Also, the length of valve stem 52 is selected so that sufficient restriction is maintained between the valve 53 and the core to develop a closing force to close shut-off valve 56. While the invention has been described in connection with the molding of tank balls from elastic material, it is understood that the tank balls can be molded from any other suitable elastic material and the molding apparatus can be utilized to form articles of various other shapes which require a core. It is also apparent that the valve mechanism can be utilized to strip articles from a two-piece mold which does not include a core. For instance, in the molding of cup-shaped articles, the core could be eliminated and the upper mold section could be shaped to form the interior of the cup-shaped article. Any undercut or other contoured surfaces in the upper section would cause the cup-shaped article to stick to the upper mold section and a shut-off valve 56 and release valve 53 contained in the upper section could be utilized to strip the article from the upper mold section. In the event the cup-shaped article was not formed of elastic material, the downward force of the release valve 53 could accomplish the stripping action, whereas if an elastic material were used, the compressed air could enter between the article and the upper mold section to effect the stripping of the article. In general, the present invention can be adapted for use in a wide variety of molding apparatus and the mold sections can be positioned either horizontally or in any other desirable manner so long as one section can move towards the other. While compressor air has been described as the working fluid, it is understood that any suitable fluid, either liquid or gas, can be utilized. Various other modifications are contemplated by those skilled in the art without departing from the spirit and scope of the invention as hereinafter defined by the appended claims.

What is claimed is:

1. A molding apparatus for producing a molded material comprising upper and lower mold sections movable relatively to one another, each of said mold sections having a cavity portion which forms a closed cavity when said mold sections are together, core means located within said closed cavity and movably supported by said upper mold section, said core means having a passage extending therethrough, means for supplying a working fluid to said passage after said mold sections are moved apart, and valve means normally closing said passage and operable by said working fluid to open said passage and cause the working fluid to move said core means downwardly away from said upper mold in order to strip the molded material from the upper mold section and then to remove the molded material from said core means.

2. A molding apparatus as defined in claim 1 having a hollow stem means for slidably supporting said core means on said upper mold section and for connecting said passage with said working fluid, stop means at one end of said stem means adjacent said core means for limiting the upward movement for said core means toward said upper mold section upon movement of said section together, and valve means at the opposite end of said stem means for limiting the downward movement of said core means after opening of said mold sections and for sealing the passage for said stem means in said upper mold section against leakage of said working fluid.

3. A molding apparatus for producing a molded article comprising a first mold section containing a first cavity portion, a second mold section containing a second cavity portion, means for moving said mold sections together to form a closed cavity from said cavity portions, said closed cavity being shaped to form the external surface of said molded article, a mold core having a core stem, said core stem being slideably supported by said first mold section, said stem having an opening connecting with an internal passage through said core, said core being positioned to form the internal surface of said article when said mold sections are together, a valve slideably supported in said passage and having fixed thereto a first valve member in normally closed position with respect to said passage and spaced therefrom, a second valve member in normally open position with respect to said passage, and means for directing a working fluid through said opening in said stem into said passage after said mold sections are moved apart by said moving means.

4. The molding apparatus defined in claim 3 further characterized by said first valve member sealing the exit opening of said core passage and forming a portion of the external surface of said core whereby upon opening of said first valve member the working fluid will escape between said core and the internal surface of said article to effect removal of said article from said core.

5. The molding apparatus defined in claim 3 further characterized by said valve being resiliently biased for normally holding said second valve member in its open position relative to said passage and said first member in its closed position relative to said passage.

6. A molding apparatus for producing a molded material comprising first and second mold sections movable relatively to one another, a closed cavity being formed by said mold sections when the sections are together, core means located within said cavity and movably supported by one of said mold sections, a passage extending through said core means, said passage having an entry opening and an exit opening, means for supplying a working fluid to said passage after said mold sections are moved apart, and valve means slideable in said passage for sealing and unsealing such passage in response to said working fluid, said valve means being biased to normally close said exit opening and open said entry opening, said valve means being moveable in one direction by the force exerted by said working fluid a distance sufficient to unseal said exit opening in order to cause the working fluid to remove the molded material from said core means and moveable further in said one direction a distance sufficient to seal said entry opening upon said molded material being removed from said core thereby preventing the escape of said working fluid.

7. The molding apparatus defined in claim 6 further characterized by said core means having a hollow stem for slideably supporting said core means in said one mold section and for connecting said passage with said working fluid, and said stem having stop means for limiting the movement of said core means relative to said one mold section.

8. The molding apparatus defined in claim 6 further characterized by said closed cavity comprising a plurality of cavities positioned in said mold sections in a selected pattern, each of said cavities containing core means having a passage and valve means and said supplying means comprising a manifold in said one mold section for simultaneously connecting each of said cavities with the source of working fluid.

9. A mold core mechanism comprising a mold core, said core having a stem portion and a passage extending through said stem portion and said core, said passage having a pair of spaced valve seats, valve means in said passage comprising a first valve member in normally closed position with respect to one of said valve seats and a second valve member in normally open position with respect to the other of said valve seats, said valve members being movable in unison, and means for supplying a working fluid to said passage, said first valve member being opened by the force of the working fluid to permit the fluid to escape said passage and said second valve member being closed by additional opening of said first valve member by said working fluid.

10. The mold core mechanism defined in claim 9 further characterized by said first valve member and said second valve member of said valve means being connected together and held in normal position by spring means acting between said core and said second valve member.

References Cited in the file of this patent

UNITED STATES PATENTS

| | | |
|---|---|---|
| Re. 23,176 | Milner | Nov. 29, 1949 |
| 341,295 | Westinghouse | May 4, 1886 |
| 1,086,215 | Porter | Feb. 3, 1914 |
| 1,334,006 | Welshausen | Mar. 16, 1920 |
| 2,090,880 | Williams | Aug. 24, 1937 |
| 2,183,912 | Isler | Dec. 19, 1939 |
| 2,377,892 | Lippincott | June 12, 1945 |
| 2,509,880 | Pelton | May 30, 1950 |
| 2,629,897 | Mahla | Mar. 3, 1953 |
| 2,741,797 | Britton | Apr. 17, 1956 |
| 2,775,789 | Soderquist | Jan. 1, 1957 |